(12) United States Patent
Ryu et al.

(10) Patent No.: US 7,819,792 B2
(45) Date of Patent: Oct. 26, 2010

(54) AUTOMATIC BALANCE ADJUSTING CENTRIFUGE

(75) Inventors: Heuigeun Ryu, Seoul (KR); Ohhun Kwon, Seoul (KR); Sunghyuk Lee, Seoul (KR); Sanghoon Lee, Seoul (KR)

(73) Assignee: Hanlab Corporation, Paju-si (KR)

( * ) Notice: Subject to any disclaimer, the term of this patent is extended or adjusted under 35 U.S.C. 154(b) by 0 days.

(21) Appl. No.: 12/202,600

(22) Filed: Sep. 2, 2008

(65) Prior Publication Data
US 2010/0009831 A1 Jan. 14, 2010

(30) Foreign Application Priority Data
Jul. 10, 2008 (KR) ............... 10-2008-0067109

(51) Int. Cl.
*B04B 5/02* (2006.01)
*B04B 9/14* (2006.01)
*B04B 13/00* (2006.01)

(52) U.S. Cl. ............... 494/10; 494/20; 494/82; 74/572.4

(58) Field of Classification Search ............ 494/1, 494/10, 12, 16–21, 33, 82, 84; 73/457–458; 210/85, 144; 68/23.1, 23.2; 74/570.2, 571.1, 74/572.4
See application file for complete search history.

(56) References Cited

U.S. PATENT DOCUMENTS

| | | | | |
|---|---|---|---|---|
| 3,834,613 A | * | 9/1974 | Hankey | 494/16 |
| 3,921,898 A | * | 11/1975 | Finkel | 494/26 |
| 4,919,646 A | * | 4/1990 | Perdriat | 494/1 |
| 6,949,063 B2 | * | 9/2005 | Baik et al. | 494/1 |
| 7,285,085 B2 | * | 10/2007 | Kim et al. | 494/20 |
| 7,297,097 B2 | * | 11/2007 | Ryu et al. | 494/10 |
| 2006/0252627 A1 | * | 11/2006 | Kim et al. | 494/20 |
| 2010/0009831 A1 | * | 1/2010 | Ryu et al. | |
| 2010/0009833 A1 | * | 1/2010 | Ryu et al. | |

FOREIGN PATENT DOCUMENTS

JP 2003236409 A * 8/2003
WO WO 2006054828 A1 * 5/2006

* cited by examiner

*Primary Examiner*—Charles E Cooley
(74) *Attorney, Agent, or Firm*—Rothwell, Figg, Ernst & Manbeck, P.C.

(57) ABSTRACT

The present invention relates to the automatic balance adjusting centrifuge that enhances the efficiency of space utilization by simplifying the structure as well as supports a precise movement by improving the structure of the balance weight transport apparatus in the automatic balance adjusting centrifuge that compensates the unbalance of the centrifugal force by transferring the balance weight equipped in the rotor rotational arm. According to the automatic balance adjusting centrifuge of the present invention, the structure is simplified as well as the precise and exact transfer of the balance weight is possible by connecting the balance weight with the axis of the motor directly and adopting the length sensor. Furthermore, the efficiency of space utilization is enhanced because the axis of rotation of the balance weight transfer motor is in radial direction of the rotational arm.

9 Claims, 9 Drawing Sheets

Fig. 1

- PRIOR ART -

AUTOMATIC BALANCE ADJUSTING CENTRIFUGE

CROSS REFERENCE TO RELATED APPLICATIONS

This application claims priority from Korean patent application No. 10-2008-0067109 filed on Jul. 10, 2008, all of which is incorporated herein by reference in its entirety for all purposes.

BACKGROUND OF THE INVENTION

1. Field of the Invention

The present invention relates to an automatic balance adjusting centrifuge, and particularly to an automatic balance adjusting centrifuge compensating for the imbalance of the centrifugal force by transferring balance weights equipped in rotating arms.

2. Description of the Related Art

As is well known, a centrifuge is an essential equipment which is widely used over medical and physiochemical fields, and is an instrument which separates sample elements by rotating a rotor equipped with buckets containing samples at a high speed to provide the samples with high centrifugal acceleration. Thus, high density elements in the samples are placed at the outer layer along the radial direction of the rotor and low density elements in the samples are placed at the inner layer along the radial direction.

In the operation of the centrifuge, imbalance of the centrifugal force is inevitably created by the weight differences among buckets due to the discrepancy in the number of samples within each bucket or in the total weight. However, the conventional centrifuge without the automatic balancing function brought about a problem of imposing the laborious works on users, such as measuring the weight of each sample manually to load the samples with an identical weight on a rotor symmetrically.

To address this problem, the applicant has already suggested several automatic balance type centrifuges and reserved the rights in United States as patents. To be concrete, United States patent registration number U.S. Pat. No. 7,285, 085 B2 (registered date: Oct. 23, 2007) (hereafter, it is referred to Preceding Invention; PI) discloses an automatic balance type centrifuge including a rotor, wherein the rotor comprises: a plurality of rotating arms, e.g. three rotating arms, which support buckets containing samples, have the same radial length from a rotational shaft for centrifuging, and are disposed around the rotational shaft with equal angles; a balance weight installed to be movable along the radial direction of each rotating arm so as to compensate for the imbalance induced by the centrifugal force during centrifugal separation process; and a balance weight transfer mechanism transferring each balance weight horizontally along the radial direction of each corresponding rotating arm. In PI, detection of imbalance of the centrifugal force, that is, imbalance of bucket weights, for example, can be carried out by an electronic scale which is installed in separate from the rotor and goes up and down in the lower part of each bucket.

Figure 1:
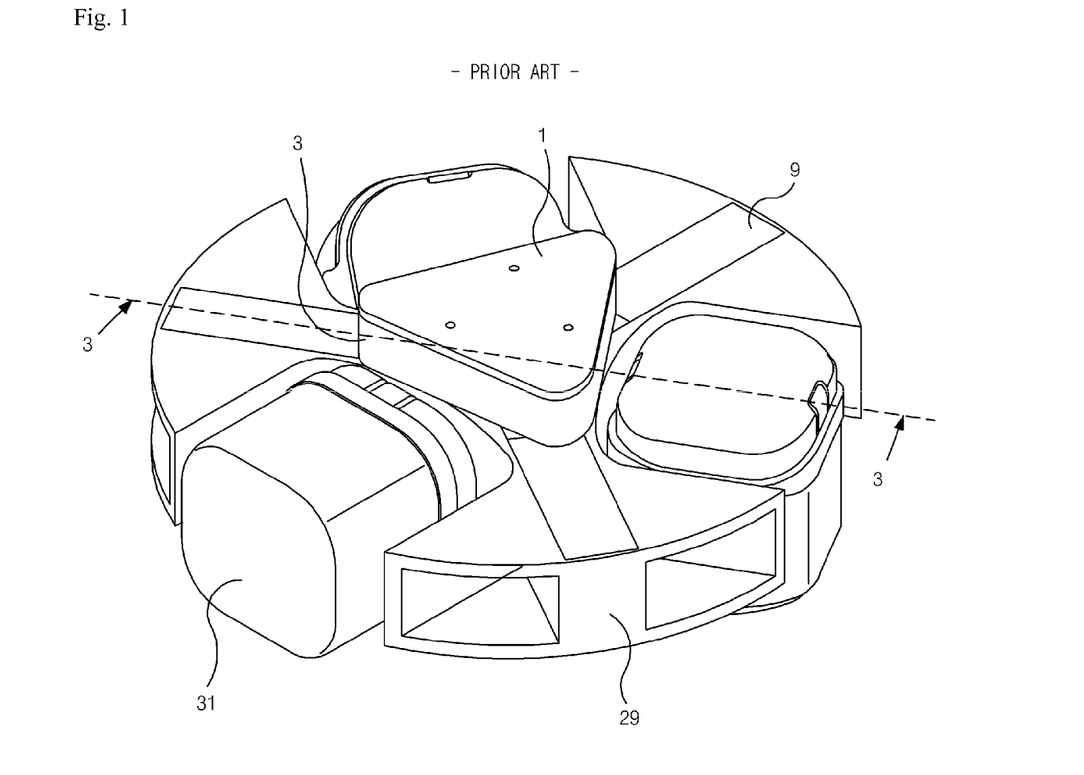
FIG. 1 is a perspective view of a rotor of a centrifuge proposed in the PI.
Figure 2:
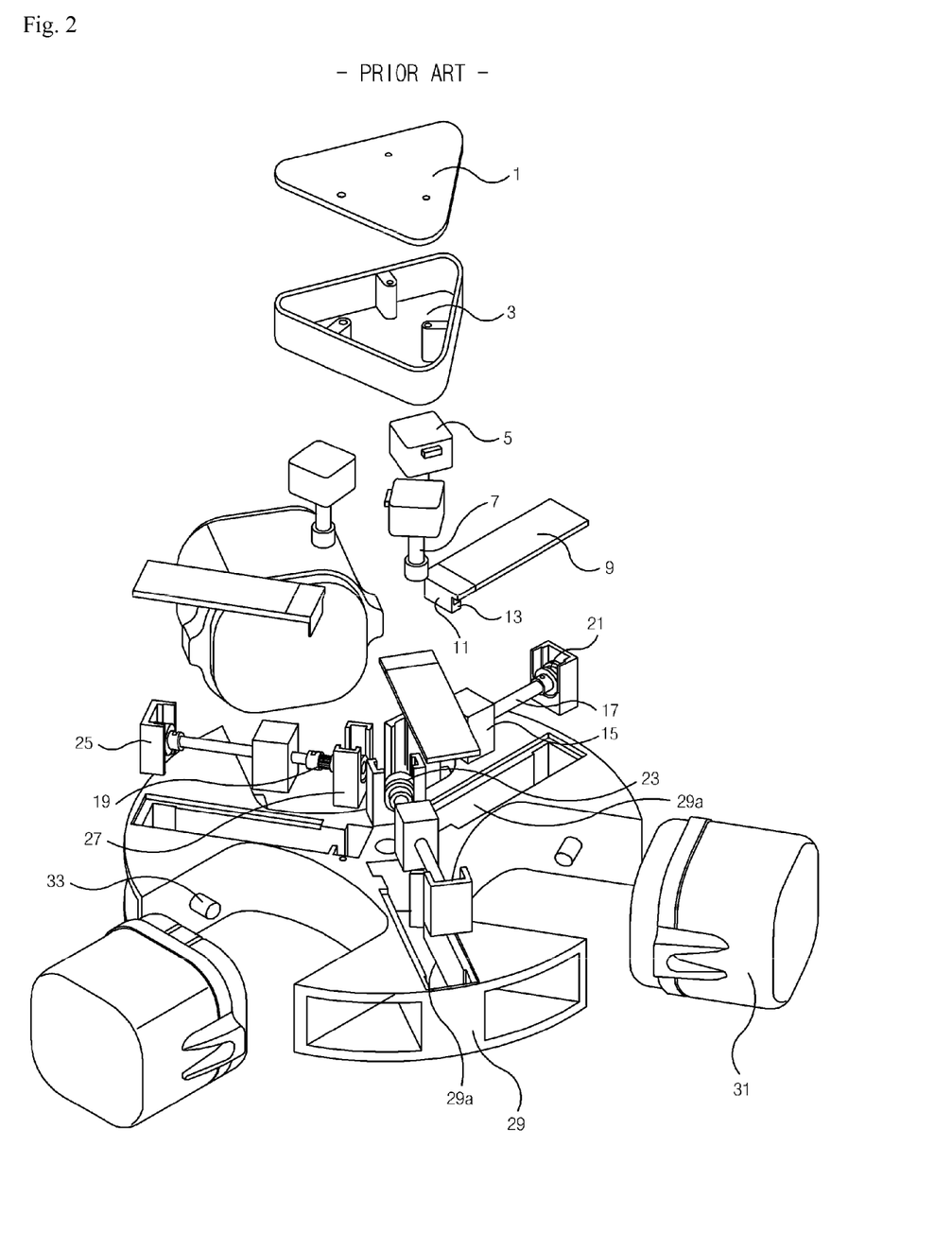
FIG. 2 is an exploded view of a rotor of the centrifuge proposed in the PI.
Figure 3:
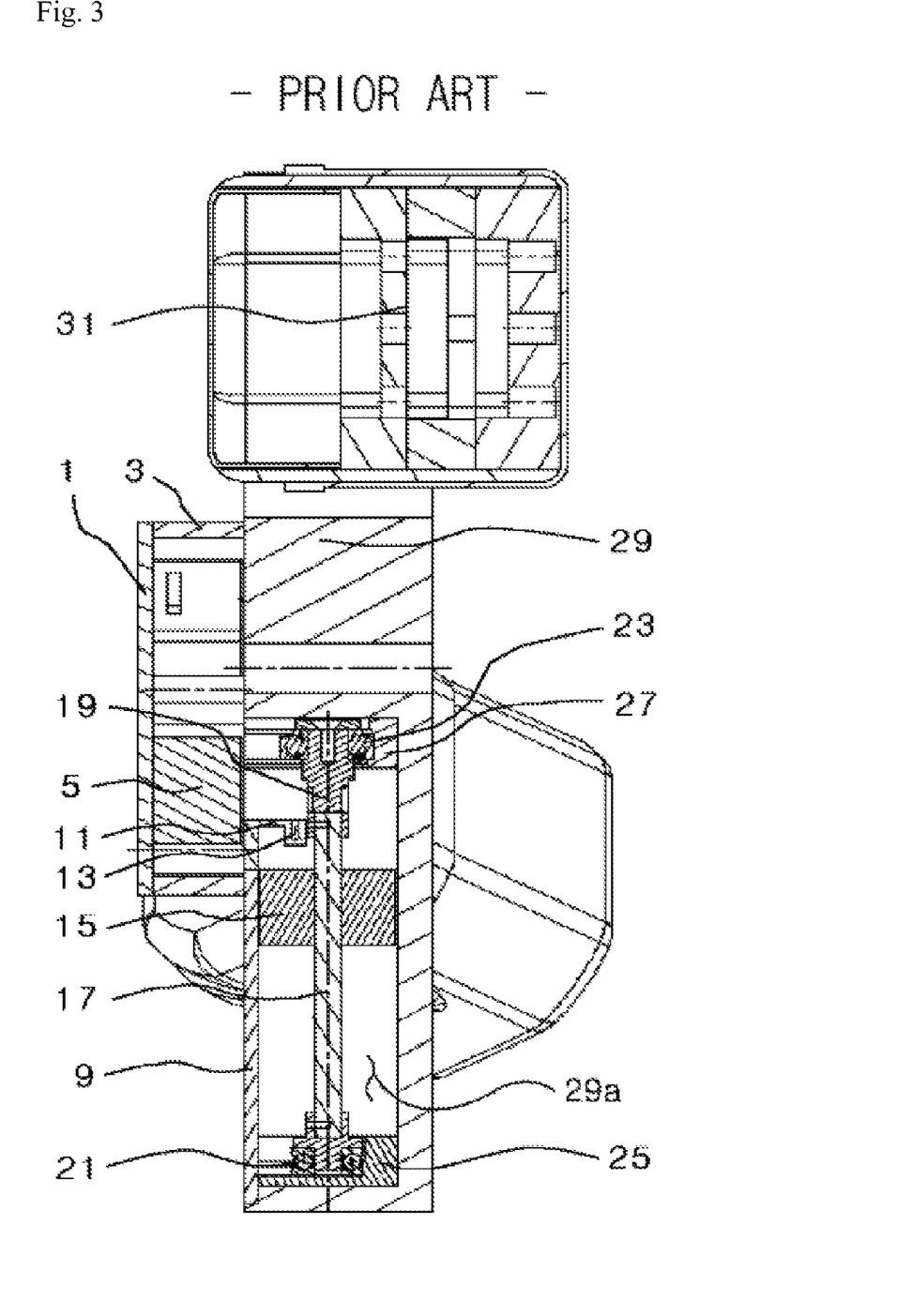
FIG. 3 is the cross sectional view of a rotor of the centrifuge proposed in the PI.

FIGS. 1, 2, and 3 are perspective view of a rotor of a centrifuge proposed in the PI, exploded view, and the cross-sectional view, respectively. As shown in FIG. 1 through FIG. 3, the rotor of the centrifuge of the PI can comprise the three rotating aims 29 supporting sample-loaded buckets 31, a balance weight 15 installed in each rotating arm 29 to compensate for the weight imbalance of the rotor during the centri-fuging process, and a balance weight transfer mechanism transferring the balance weight 15 along the radial direction of each rotating arm 29.

In the configuration described in the above, the rotating arm 29 can be formed by cutting away some portion equiangularly, which is supposed to install buckets 31, from a disk with a prescribed thickness, and in the present preferred embodiment, each rotating arm 29 maintains 120.degree. interval with each other. And at both sides of each rotating arm 29, bucket supporting pins 33 are formed to support the buckets 31 to be assembled so that adjacent rotating arms 29 cooperate to support the buckets 31.

Meanwhile, in each rotating arm 29, a slot 29a is formed along the radial direction to guides the balance weight 15 to be transferred along the horizontal direction, and is preferably implemented as a rectangle-type long groove. The balance weight 15 is preferably implemented as the form of hexahedron in order not to be rotated in the slot 29a, and has the female screw (not illustrated) formed in the center.

Each balance weight transfer mechanism can comprise a balance weight transfer motor 5 installed at the center part of the rotor, whose shaft is in the line of the vertical axis; a worm 7 coupled with the end of the shaft of the balance weight transfer motor 5 by shaft coupling; a balance weight transfer shaft 17 which is installed in a longitudinal direction within the slot 29a and of which an outer circumferential surface a male screw is formed on to couple with a female screw of the balance weight 15 by screwed connection; a worm gear 19 coupled with the worm 7 by gear coupling and also coupled with one end of the balance weight transfer shaft 17 by shaft coupling; a thrust bearing 21 and a radial bearing 23 which are coaxially coupled with each end of the balance weight transfer shaft 17 respectively.

Meanwhile, in transferring the balance weight 15 horizontally within the slot 29a, a position sensor 13, preferably a limit switch, is required to sense the fixed reference position, and the position sensor 13 may be installed at proper position of the slot 29a, preferably at a support bracket 11 installed by extending downward from a balance weight cover 9 (slot cover 9). Non-described reference numbers 3 and 1 in the figures indicate a supporting frame to support the balance weight transfer motor 5 and a motor cap 1 to cover the top of the supporting frame 3, respectively, and another non-described reference number 9 indicates a slot cover to cover the top of the slot 29a. The reference number 25 and 27, respectively, indicate housings to fix a thrust bearing 21 and a radial bearing 23 inside the slot 29a.

However, in the conventional automatic balance adjusting centrifuge as described in the above, there has been a difficulty of designing/manufacturing for enhancing the contact ratio of tooth surface between a worm and a rack-type worm wheel, because it uses a worm shaft-coupled with a balance weight transfer motor, a worm gear tooth-coupled with the worm, and a balance weight transfer shaft coaxial-coupled with the worm gear, as balance weight transferring means.

Furthermore, there have been some problems such that accuracy falls down because of analogizing the current position of a balance weight with the number of rotation of the balance weight transfer motor implemented simply by a step motor, structure is complicated because of separating a balance weight transfer shaft from a motor shaft, and the efficiency of space utilization is low because of installing the balance weight transfer motor as the shaft faces to vertical direction.

SUMMARY OF THE INVENTION

Technical Problem

The present invention is proposed to solve the problems described above. The object of the present invention is to provide an automatic balance adjusting centrifuge that enhances the efficiency of space utilization by simplifying the structure of a balance weight transfer mechanism in an automatic balance adjusting centrifuge compensating for imbalance of the centrifugal force by transferring a balance weight equipped in a rotating arm as well as enables a balance weight to move precisely by improving the structure.

Technical Solution

To achieve the above object, an automatic balance adjusting centrifuge of the present invention includes a rotor with a plurality of rotating arms which have the same radial length from a rotational shaft for centrifuging, are disposed with equal angles around the rotational shaft, and support buckets containing samples, wherein the automatic balance adjusting centrifuge comprises: a motor installed in each rotating arm for its rotational shaft, outer circumferential surface of which a male screw is formed on to transfer a balance weight, to face to the radial direction; a balance weight having a female screw formed through its body horizontally to be combined with the male screw by screwed connection, a guiding means to guide the straight-line motion of the balance weight; a reference position sensing means to sense the reference position of the balance weight; a current position sensing means to sense the current position of the balance weight; a controlling means to calculate the distance between the reference position sensed by the reference position sensing means and the current position sensed by the current position sensing, and to control the motor to transfer the balance weight for a set length.

In the above configuration, the guiding means comprises two or more through-holes formed in the balance weight and guide bars inserted into each through-hole in parallel with the rotational shaft for transferring.

The current position sensing means comprises a gear disk which is made of magnetic substance, is coupled with an end of the rotational shaft by shaft-coupling to rotate with the rotational shaft, and has a plurality of teeth formed on the circumferential surface with an equal interval; and hall sensors installed on the same plane with the gear disk at regular intervals.

On the other hand, the current position sensing means may comprise a capacitive sensor including: a dielectric fixed bar installed on the balance weight to the direction for transferring the balance weight; and a pair of fixed electrodes installed along the transfer path of the dielectric bar, sandwiching the dielectric bar and facing with each other.

Meanwhile, the reference position sensing means comprises any one of a physical contact type sensor, a light receiving type sensor, and a magnetic field sensing type sensor.

Advantageous Effects

According to the automatic balance adjusting centrifuge of the present invention, the adoption of a length sensor and the direct connection between a balance weight and a motor shaft enable to transfer the balance weight precisely and correctly and also to simplify the structure of the centrifuge. Furthermore, the efficiency of space utilization is enhanced because a rotational shaft of a motor for transferring the balance weight is disposed in the radial direction of the rotating arm.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

In the following, preferred embodiments of the automatic balance adjusting centrifuge of the present invention are described in detail referring to the accompanying drawings.

Figure 4:
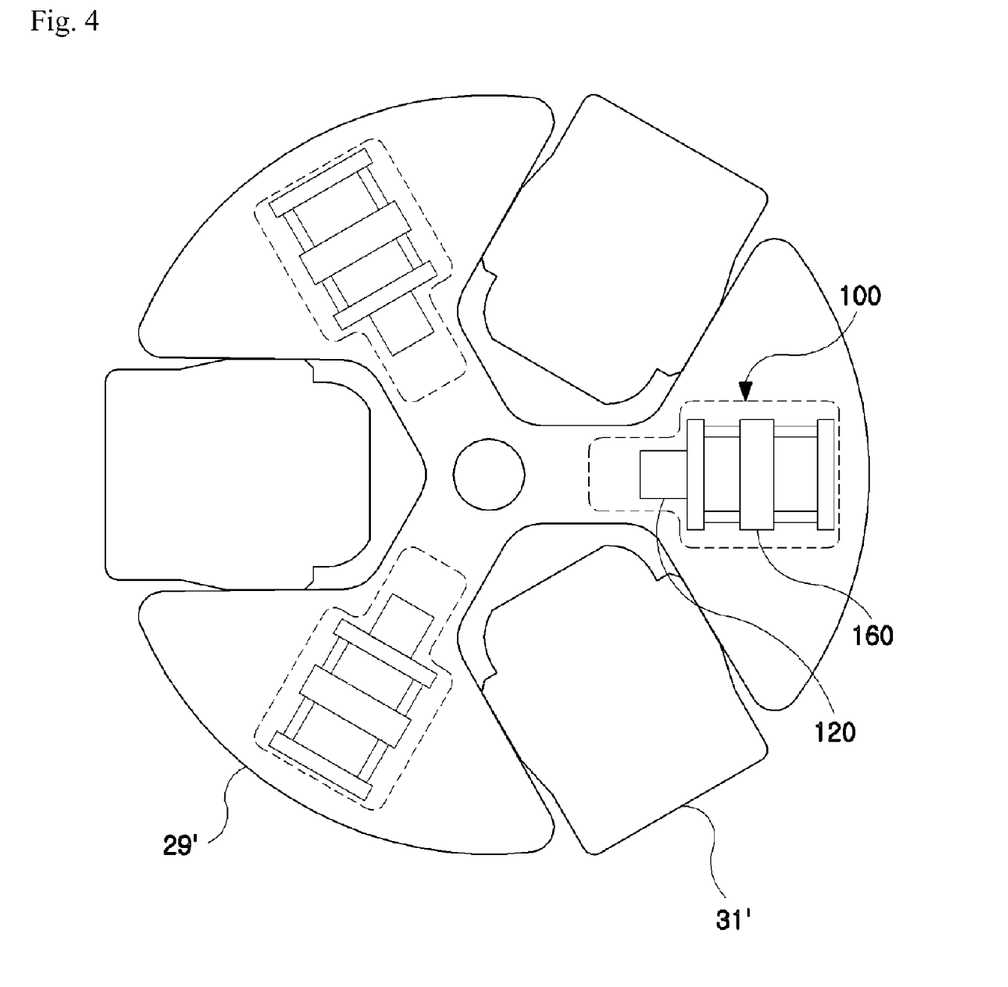
FIG. 4 is a plane view of a rotor of an automatic balance adjusting centrifuge according to one embodiment of the present invention.

FIG. 4 is a plane view showing a rotor of an automatic balance adjusting centrifuge according to one embodiment of the present invention. As shown in FIG. 4, the automatic balance adjusting centrifuge of the present invention can include a rotor having three rotating arms 29' to support buckets 31' loading samples as described in PI, and a balance weight transfer mechanism 100, including a balance weight 160 to compensate for the weight imbalance of the rotor and a balance weight transfer motor 120 to transfer the balance weight 160 horizontally along the radial direction of each rotating arm 29', is installed in each rotating arm 29'.

In the configuration described in the above, the rotating arm 29' can be formed by cutting away some portion equiangularly, which is supposed to install buckets 31', from a disk with a prescribed thickness, and in the present preferred embodiment, each rotating arm 29' maintains 120.degree. interval with each other. And at both sides of each rotating arm 29', bucket supporting pins (not illustrated) are formed to support bucket 31' to be assembled so that adjacent rotating arms 29' cooperate to support the buckets 31'.

Figure 5:
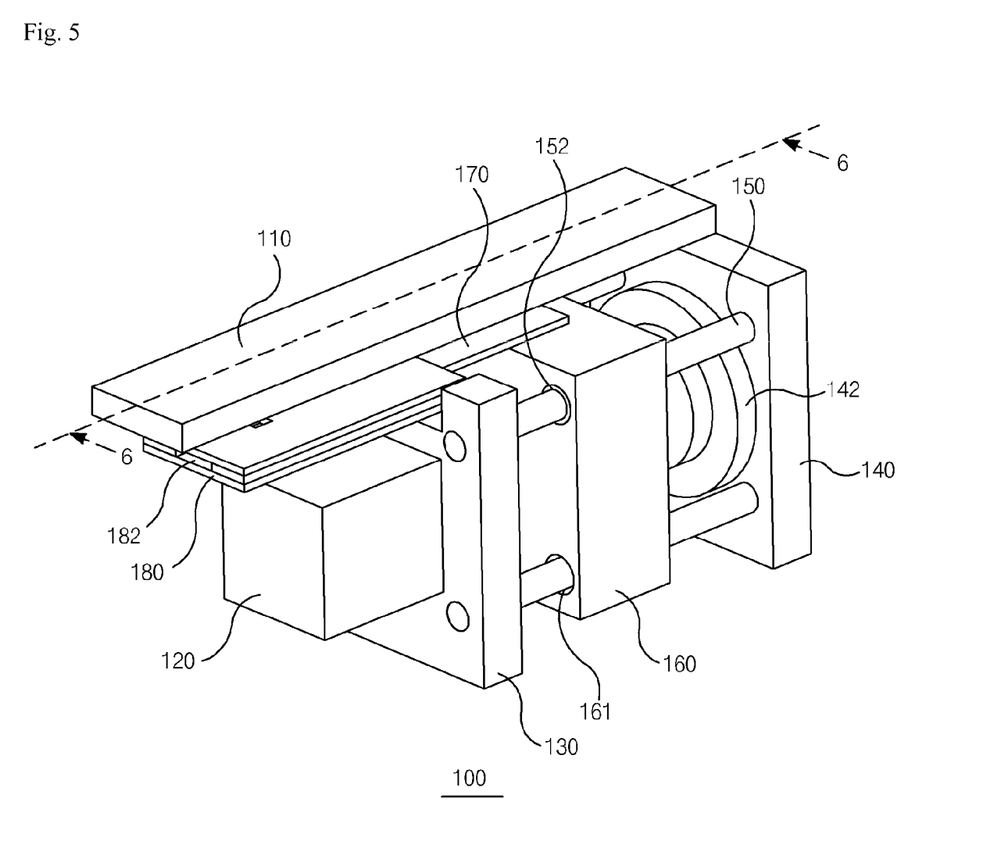
FIG. 5 is a perspective view of a balance weight transfer mechanism according to one embodiment of an automatic balance adjusting centrifuge of the present invention.
Figure 6:
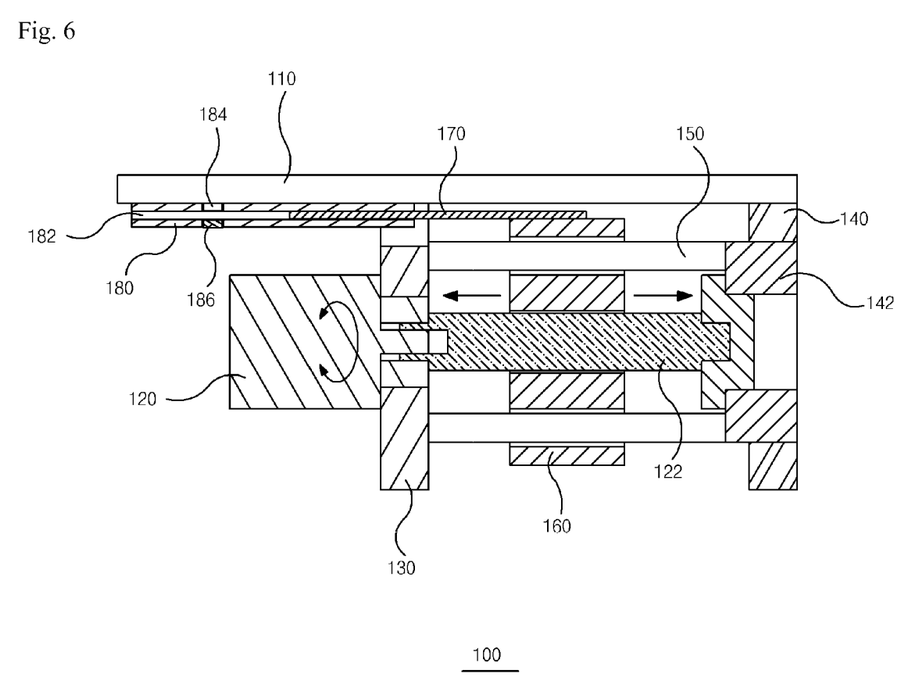
FIG. 6 is a cross-sectional view sectioned along the line 6-6 in FIG. 5.

FIG. 5 is a perspective view of a balance weight transfer mechanism in the automatic balance adjusting centrifuge according to one embodiment of the present invention, and FIG. 6 is a cross-sectional view sectioned along the line 6-6 in FIG. 5. As shown in FIGS. 5 and 6, according to one embodiment of the balance weight transfer mechanism 100 in the automatic balance adjusting centrifuge of the present invention, the balance weight transfer motor 120 is installed and fixed in each rotating arm 29' for a rotational shaft 122 of it to face to the radial direction of the rotating arm 29', and it is supported and fixed by a motor bracket 130 preferably at a inner side of the rotating arm 29', that is, at a position near to a rotational shaft for centrifuging. The rotational shaft 122 of the transfer motor comprises a screw bar of which circumferential surface a male screw is formed on, and the end thereof is supported by a bearing 142 mounted in the bearing housing 140 to be rotatable.

Meanwhile, a balance weight 160 can be implemented with rigid materials in the shape of rectangle (or disk) and can be coupled with the male screw of the transfer motor rotational shaft 122 by screwed coupling because a female screw is formed through the center of the body thereof. Moreover, 4 through-holes 161 piercing the body horizontally are formed in the vicinity of each corner of the balance weight. Thus, the motor bracket 130 and the bearing housing 140 includes 4 guide bars 150 inserted into each through-hole 161 of the balance weight 160 and installed in parallel so that the guide bars guide the balance weight 160 to do a straight-line motion in spite of the torque of the transfer motor rotational shaft 122. The diameter of the through-hole 161 is a little bit longer than the diameter of the guide bar 150. Thus, the bushing 152 having the diameter almost equal to the diameter of the guide bar is inserted to any one (or two) of through-hole 161 to prevent the balance weight 160 from fluctuating during the moving process.

Meanwhile, this preferred embodiment adopts a capacitance type sensor to detect the current position of the balance weight 160, and a dielectric fixed bar made of dielectric material is installed at the proper place, for example, at upper side of the balance weight 160 to the direction for transferring the balance weight.

The length of the dielectric bar 170 is longer than the transferable distance of the balance weight 160. In the figures, the reference number 110 represents a base cover that is mounted on the top of the motor bracket 130 and the bearing housing 140, and a sensor circuit board 180 is installed under the base cover 110. A path 182 for the dielectric bar is formed on the sensor circuit board 180 along the longitudinal direction, and electrodes is disposed at both end of the path 182 for dielectric bar to sense the capacitance that is varied according to the position of the dielectric bar 170.

In the figures, the reference numbers 184 and 186 represent a light emitting part and a light receiving part, respectively, of a photo-coupler installed on the path 182 for the dielectric bar in order to detect a reference position of the balance weight 160, and if the dielectric bar 170 does not exist then the light from the light emitting part 184 of the photo-coupler reaches the light receiving part 186, but if the balance weight 160 retrogrades and the leading end of the dielectric bar 170 arrives at the position of the photo-coupler then immediately the light from the light emitting part is blocked by the dielectric bar 170 so that the arrival of the balance weight 160 at the reference position can be detected.

Figure 7:
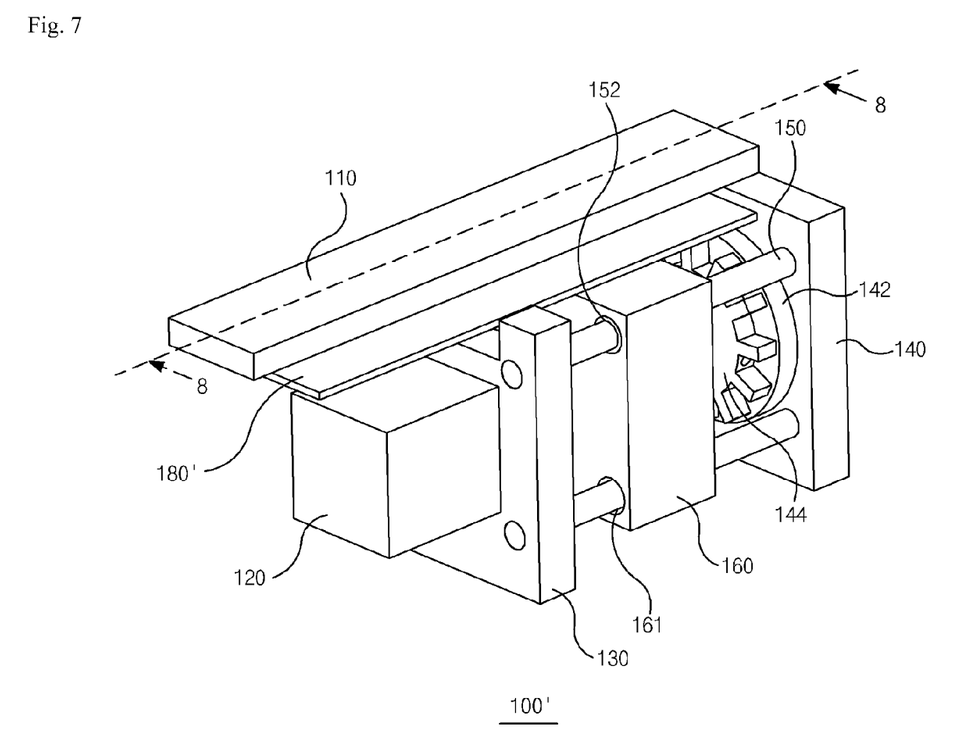
FIG. 7 is a perspective view of a balance weight transfer mechanism according to another embodiment of an automatic balance adjusting centrifuge of the present invention.
Figure 8:
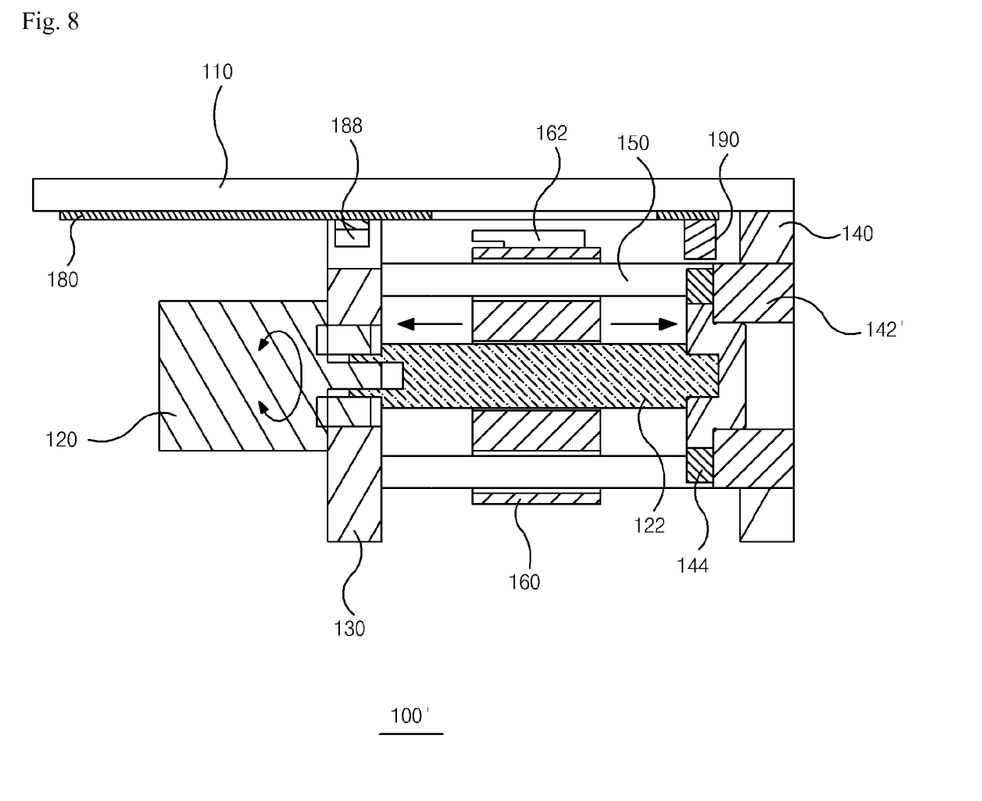
FIG. 8 is a cross-sectional view sectioned along the line 8-8 in FIG. 7.

FIG. 7 is a perspective view of a balance weight transfer mechanism 100' in the automatic balance adjusting centrifuge according to another preferred embodiment of the present invention and FIG. 8 is the cross-sectional view sectioned along the line 8-8 in FIG. 7. Therefore, the same reference numbers are given for the corresponding components of FIGS. 5 and 6, and the detail description about them is omitted. As shown in FIGS. 7 and 8, in this preferred embodiment, a hall sensor is adopted as the sensor to detect the current position of the balance weight 160 and the hall sensor 190 is mounted on the sensor circuit board 180' installed under the base cover 110 to face downward.

Meanwhile, a gear disk 144 made of magnetic substance, of which the circumferential surface a plurality of teeth are formed on with an equal interval, is fixed and installed on outer circumference of the bearing 142'. In this configuration, if the transfer motor rotational shaft 122 rotates then the gear disk 144 also rotates together, so that the hall sensor 190 detects the current position of the balance weight 160 as the indirect mode (described later) by sensing the variation of the magnetic field which is caused by getting near or away of the teeth during the rotating process.

Next, the preferred embodiment adopts a lead switch 188 turned on/off by sensing magnetic force as the sensor to detect the reference position of the balance weight 160, wherein the lead switch 188 is installed at proper position beneath the sensor circuit board 180'. Meanwhile, a permanent magnet 162 is mounted on the top of the balance weight 160 for responding to the lead switch 188 so that, if the balance weight retrogrades and the permanent magnet 162 is accurately positioned under the lead switch, the arrival of balance weight 160 at the reference position can be detected by turning on or off the lead switch 188.

Figure 9:
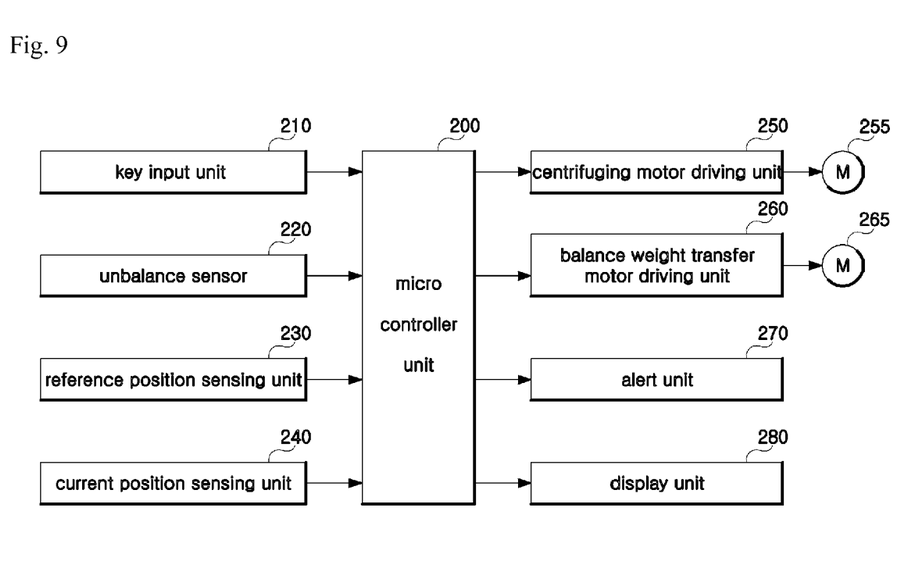
FIG. 9 is a block diagram of the electrical part in the automatic balance adjusting centrifuge of the present invention.

FIG. 9 is a block diagram of the electrical part in the automatic balance adjusting centrifuge of the present invention. As shown in FIG. 9, the electrical configuration of the automatic balance adjusting centrifuge of the present invention comprises: a key input unit 210 that receives or sets up all kinds of information required to operate the centrifuge; a imbalance detection unit 220 to detect the weight imbalance of the centrifuge rotor; a reference position sensing unit 230 to sense the reference position of the balance weight; a current position sensing unit 240 to sense the current position of the balance weight; a centrifuging motor 255 to rotate the rotor and a driving unit 250 thereof; a balance weight transfer motor 265 to transfer the balance weight and a driving unit 260 thereof; an alarm unit 270 to give an alarm for the occurrence of the malfunction or the over-vibration of the centrifuge; a display unit 280 to display all kinds of information generated during the operation of the centrifuge; and a microcontroller unit 200 to control the overall operation of the centrifuge generally.

In the configuration described in the above, a centrifuging motor 255 may be, for example, a brushless DC motor and a balance weight transfer motor 265 may be a step motor. The unbalance sensor can be performed, for example, as described in PI, by an electronic scale that is installed separately from a rotor and goes up and down under the bucket.

As described above, the reference position sensing unit 230 can include a photo-coupler or a lead switch, beside that it can comprise a micro switch turned on/off by the physical contact.

As described above, the current position sensing unit 240 can include a capacitance type sensor or a hall sensor, and it senses the current position of the balance weight as indirect mode converting the number of tooth into distance in case of the hall sensor, while it senses directly the distance from the reference position to the current position of the balance weight in case of the capacitance type sensor. That is, whenever the hall sensor detects the tooth of the gear disk, it delivers the detection result to the microcontroller unit 200, and the microcontroller unit 200 counts the number of the tooth by the inside counter, which is reset at the time of arrival of the balance weight at the reference position, and converts the counted number into distance so that it gets hold of the current position of the balance weight and places the balance weight on the desirable position.

Finally, the microcontroller unit 200 can comprise a microprocessor and attached memories, and, as described above, the distance conversion table or various kinds of setting values are stored in the attached memories.

The automatic balance adjusting centrifuge of the present invention is not to be limited to the above-described embodiments and it can be modified and implemented variously within the technical field of the present invention. For example, the number of rotating aims can be 2, 4, or more. Meanwhile, in case of the photo-coupler sensing the reference position of the balance weight, as described above, the reflective type photo-coupler can be adopted beside the transmissive type.

What is claimed is:

1. An automatic balance adjusting centrifuge that includes a rotor with a plurality of rotating arms which are disposed to have the same radial length from a rotational shaft for centrifuging and with equal angles around the rotational shaft, and which support buckets containing samples, comprising:
    a motor installed in each rotating arm;
    a balance weight having a female screw formed through the center thereof horizontally;
    a motor rotational shaft having a male screw formed on an outer circumferential surface to engage with the female screw of the balance weight, wherein the motor is directly connected to one end of the shaft such that the shaft faces a radial direction of the rotating arm and the balance weight is movable along the shaft;
    a guiding means to guide a straight-line motion of the balance weight;
    a reference position sensing means to sense a reference position of the balance weight;
    a current position sensing means to sense the current position of the balance weight; and
    a controlling means to calculate the distance between the reference position sensed by the reference position sensing means and the current position sensed by the current position sensing means, and to control the motor to transfer the balance weight by a set length along the motor rotational shaft.

2. The automatic balance adjusting centrifuge of claim 1, wherein the guiding means comprises two or more through-holes formed in the balance weight and a guide bars inserted into each of the through-holes in parallel with the motor rotational shaft.

3. The automatic balance adjusting centrifuge of claim 2, wherein the current position sensing means comprises: a gear disk and a hall sensors installed on the same plane with the gear disk at regular intervals, wherein the gear disk is made of magnetic substance, is coupled with an end of the motor rotational shaft by shaft-coupling to rotate with the motor rotational shaft, and has a plurality of teeth formed on the circumferential surface with an equal interval.

4. The automatic balance adjusting centrifuge in claim 3, wherein the reference position sensing means comprises at least one sensor selected from the group consisting of a physical contact type sensor, a light receiving type sensor, and a magnetic field sensing type sensor.

5. The automatic balance adjusting centrifuge of claim 2, wherein the current position sensing means comprises a capacitive sensor including a dielectric fixed bar installed on top of the balance weight in a direction for transferring the balance weight; and a pair of fixed electrodes installed along a path for moving the dielectric bar, sandwiching the dielectric bar and facing with each other.

6. The automatic balance adjusting centrifuge in claim 5, wherein the reference position sensing means comprises at least one sensor selected from the group consisting of a physical contact type sensor, a light receiving type sensor, and a magnetic field sensing type sensor.

7. The automatic balance adjusting centrifuge in claim 2, wherein the reference position sensing means comprises at least one sensor selected from the group consisting of a physical contact type sensor, a light receiving type sensor, and a magnetic field sensing type sensor.

8. The automatic balance adjusting centrifuge in claim 1, wherein the reference position sensing means comprises at least one sensor selected from the group consisting of a physical contact type sensor, a light receiving type sensor, and a magnetic field sensing type sensor.

9. The automatic balance adjusting centrifuge in claim 1, further comprising a motor bracket for fixing the motor in the rotating arms.

* * * * *